United States Patent [19]

Toda et al.

[11] Patent Number: 5,023,014
[45] Date of Patent: Jun. 11, 1991

[54] PHOSPHOR

[75] Inventors: Hiroyuki Toda; Junji Miyahara; Kenji Takahashi, all of Kanagawa, Japan

[73] Assignee: Fuji Photo Film Co., Ltd., Minamiashigara, Japan

[21] Appl. No.: 403,072

[22] Filed: Sep. 5, 1989

Related U.S. Application Data

[60] Continuation of Ser. No. 794,377, Nov. 4, 1985, abandoned, which is a continuation of Ser. No. 657,171, Oct. 3, 1984, abandoned, which is a division of Ser. No. 420,111, Sep. 20, 1982, abandoned, which is a division of Ser. No. 367,665, Apr. 12, 1982, abandoned, which is a continuation of Ser. No. 209,208, Nov. 21, 1980, abandoned.

[30] Foreign Application Priority Data

Nov. 21, 1979 [JP] Japan .................. 54-150873

[51] Int. Cl.$^5$ .............................................. C09K 11/62
[52] U.S. Cl. ........................... 252/301.4 H; 250/484.1
[58] Field of Search ............. 252/301.4 K; 250/327.2, 250/483.1, 484.1

[56] References Cited

U.S. PATENT DOCUMENTS

| | | | |
|---|---|---|---|
| 3,667,921 | 6/1972 | Grodkiewicz et al. | 252/301.4 H |
| 3,859,527 | 1/1975 | Luckey | 250/327.2 |
| 3,951,848 | 4/1976 | Wolfe et al. | 252/301.4 H |
| 4,057,508 | 11/1977 | Wolfe et al. | 252/301.4 H |
| 4,076,897 | 2/1978 | Joiner | 252/301.4 H |
| 4,239,968 | 12/1980 | Kotera et al. | 250/327.2 |

FOREIGN PATENT DOCUMENTS

| | | | |
|---|---|---|---|
| 53-147690 | 12/1978 | Japan | 252/301.4 H |
| 55-23115 | 2/1980 | Japan | 252/301.4 H |

*Primary Examiner*—Jack Cooper
*Attorney, Agent, or Firm*—Fleit, Jacobson, Cohn, Price, Holman & Stern

[57] ABSTRACT

A rare earth element activated complex halide phosphor and a radiation image storage panel having a fluorescent layer comprising the phosphor, which phosphor is represented by the formula:

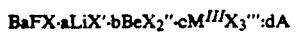

$$BaFX \cdot aLiX' \cdot bBeX_2'' \cdot cM^{III}X_3''' :dA$$

wherein $M^{III}$ is at least one trivalent metal selected from the group consisting of Al and Ga, each of X, X', X" and X''' is at least one halogen selected from the group consisting of Cl, Br and I, A is at least one rare earth element selected from the group consisting of Eu, Tb, Ce, Tm, Dy, Pr, Ho, Nd, Yb, Er, Gd, Lu, Sm and Y, a, b and c are numbers satisfying the conditions of $0 \leq a \leq 0.1$, $0 \leq b \leq 0.1$, $0 \leq c \leq 0.1$ and $10^{-4} \leq a+b+c \leq 0.1$, and d is a number satisfying the condition of $10^{-6} \leq d \leq 0.2$. The phosphor emits light of high luminance when stimulated by light having a wavelength within the range of 500 to 1100 nm after exposure to a radiation such X-rays, ultraviolet rays, cathode rays, or the like. Further, the phosphor exhibits little fading. Accordingly, the radiation image storage panel has high sensitivity and exhibits improved fading property.

2 Claims, 2 Drawing Sheets

PHOSPHOR

This application is a continuation of application Ser. No. 794,377, filed Nov. 4, 1985, now abandoned which is a continuation of application Ser. No. 657,171 filed Oct. 3, 1984, now abandoned, which is a divisional of application Ser. No. 420,111, filed Sept. 20, 1982, now abandoned, which is a divisional of application Ser. No. 367,665, filed Apr. 12, 1982, now abandoned, which is a continuation of application Ser. No. 209,208, filed Nov. 21, 1980, now abandoned.

BACKGROUND OF THE INVENTION

1. Field of the Invention

This invention relates to a stimulable phosphor and a radiation image storage panel utilizing the same, and more particularly relates to a rare earth element activated complex halide stimulable phosphor and a radiation image storage panel having a fluorescent layer comprising the same.

2. Description of the Prior Art

As is well known in the art, a photographic method using a silver salt, e.g. radiography, in which an X-ray film having an emulsion layer comprising a silver salt is used in combination with an intensifying screen has generally been employed to obtain a radiation image. Recently, from the viewpoint of problems such as the shortage of silver resources, a method of obtaining a radiation image without using a silver salt has been desired.

An example of such a method is disclosed in U.S. Pat. No. 3,859,527. In the method of the patent, there is used a radiation image storage panel comprising a stimulable phosphor which emits light when stimulated by visible light or infrared rays after exposure to a radiation (The term "radiation" as used herein means an electromagnetic wave or a corpuscular radiation such as X-rays, $\alpha$-rays, $\beta$-rays, $\gamma$-rays, high-energy neutron rays, cathode rays, vacuum ultraviolet rays, ultraviolet rays, or the like.). The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the stimulable phosphor of the panel as light emission, and (iii) electrically converting the emitted light into an image.

The radiation image storage panel employed in the above-mentioned method for recording and reproducing a radiation image has at least a fluorescent layer comprising a proper binder and a stimulable phosphor dispersed therein. Although the fluorescent layer itself can be a radiation image storage panel when the fluorescent layer is self-supporting, the fluorescent layer is generally provided on a proper substrate to form a radiation image storage panel. Further, a protective layer for physically and chemically protecting the fluorescent layer is usually provided on the surface of the fluorescent layer intended for exposure. Furthermore, a primer layer is sometimes provided between the fluorescent layer and the substrate to closely bond the fluorescent layer to the substrate. From the viewpoint of practical use of the radiation image storage panel, it is required for the panel to have high sensitivity. Further, it is required for the panel to have high ability to store the radiation energy absorbed thereby, that is, to exhibit little fading. Accordingly, it is required for the stimulable phosphor employed in the radiation image storage panel to emit light of high luminance upon stimulation thereof and to exhibit little fading.

As a stimulable phosphor which can be employed in the above-mentioned radiation image storage panel, a cerium and samarium activated strontium sulfide phosphor (SrS:Ce, Sm), a europium and samarium activated strontium sulfide phosphor (SrS:Eu, Sm), a europium and samarium activated lanthanum oxysulfide phosphor ($La_2O_2S$:Eu, Sm) and a manganese and halogen activated zinc cadmium sulfide phosphor [(Zn,Cd)S: Mn, X, wherein X is a halogen] are known (see the above-mentioned U.S. Pat. No. 3,859,527). However, the luminance of light emitted by these stimulable phosphors upon stimulation thereof is exceedingly low. Further, since the wavelength ranges of the stimulating rays of these stimulable phosphors lie mainly in the infrared region, the traps for storing radiation energy of these stimulable phosphors are relatively shallow, and therefore, these stimulable phosphors exhibit very high fading. Accordingly, the utility of the radiation image storage panels in which these stimulable phosphors are employed is low.

U.S. Pat. No. 4,239,968 discloses the use in a radiation image storage panel of a rare earth element activated barium flourohalide stimulable phosphor represented by the following formula:

BaFX:yA wherein X is at least one halogen selected from the group consisting of Cl, Br and I, A is at least one rare earth element selected from the group consisting of Eu, Tb, Ce, Tm, Dy, Pr, Ho, Nd, Yb and Er, and y is a number satisfying the condition of $0 \leq y \leq 0.2$. The rare earth element activated barium fluorohalide phosphor emits light of much higher luminance than the stimulable phosphors described in the above-mentioned U.S. Pat. No. 3,859,527 upon stimulation thereof. Further, because the wavelength range of the stimulating rays of the rare earth element activated barium fluorohalide phosphor is from 500 to 1100 nm, and the optimum wavelength range thereof is from 500 to 800 nm, the trap for storing radiation energy of the rare earth element activated barium fluorohalide phosphor are deeper than those of the stimulable phosphors described in the above-mentioned U.S. Pat. No. 3,859,527, and therefore, the former exhibits less fading than the latter. Accordingly, the radiation image storage panel utilizing the above-mentioned rare earth element activated barium fluorohalide phosphor has much higher sensitivity and exhibits less fading than the radiation image storage panels utilizing the stimulable phosphors described in the above-mentioned U.S. Pat. No. 3,859,527. Although, as mentioned above, the utility of the radiation image storage panel utilizing the above-mentioned rare earth element activated barium fluorohalide phosphor is higher than that of the radiation image storage panels utilizing the stimulable phosphors described in the above-mentioned U.S. Pat. No. 3,859,527, further improvement of the sensitivity and the fading property thereof is desired.

SUMMARY OF THE INVENTION

Therefore, one object of the present invention is to provide a stimulable phosphor which emits light of higher luminance upon stimulation thereof and exhibits less fading than the above-mentioned rare earth element activated barium fluorohalide phosphor and, of course, than the stimulable phosphors described in the above-mentioned U.S. Pat. No. 3,859,527.

Another object of the present invention is to provide a radiation image storage panel which has higher sensitivity and exhibits less fading than the radiation image storage panel employing the above-mentioned rare earth element activated barium fluorohalide phosphor and, of course than the radiation image storage panels employing the stimulable phosphors described in the above-mentioned U.S. Pat. No. 3,859,527.

In order to accomplish the above-mentioned objects, the inventors of the present invention conducted various investigations for improvement of the above-mentioned rare earth element activated barium fluorohalide phosphor. As a result of the investigations, it was found that a stimulable phosphor which emitted light of higher luminance upon stimulation thereof and exhibited less fading than the rare earth element activated barium fluorohalide phosphor was obtained by incorporating in the phosphor at least one halide selected from the group consisting of:

(i) $LiX'$ wherein $X'$ is at least one halogen selected from the group consisting of Cl, Br and I, (ii) $BeX_2''$ wherein $X''$ is at least one halogen selected from the group consisting of Cl, Br and I, and (iii) $M^{III}X_3'''$ wherein $M^{III}$ is at least one trivalent metal selected from the group consisting of Al and Ga, and $X_3'''$ is at least one halogen selected from the group consisting of Cl, Br and I.

The stimulable phosphor of the present invention is a rare earth element activated complex halide phosphor represented by the formula $$BaFX \cdot aLiX' \cdot bBeX_2'' \cdot cM^{III}X_3''' : dA$$

wherein $M^{III}$ is at least one trivalent metal selected from the group consisting of Al and Ga, each of X, X', X'' and X''' is at least one halogen selected from the group consisting of Cl, Br and I, A is at least one rare earth element selected from the group consisting of Eu, Tb, Ce, Tm, Dy, Pr, Ho, Nd, Yb, Er, Gd, Lu, Sm and Y, a, b and c are numbers satisfying the conditions of $0 \leq a \leq 0.1$, $0 \leq b \leq 0.1$, $0 \leq c \leq 0.1$ and $10^{-4} \leq a+b+c \leq 0.1$, and d is a number satisfying the condition of $10^{-6} \leq d \leq 0.2$.

The radiation image storage panel of the present invention has a fluorescent layer comprising a binder and a stimulable phosphor dispersed therein characterized in that the stimulable phosphor is at least one phosphor selected from the group of the above-mentioned rare earth element activated complex halide phosphors of the present invention.

DETAILED DESCRIPTION OF THE INVENTION

Figure 1:
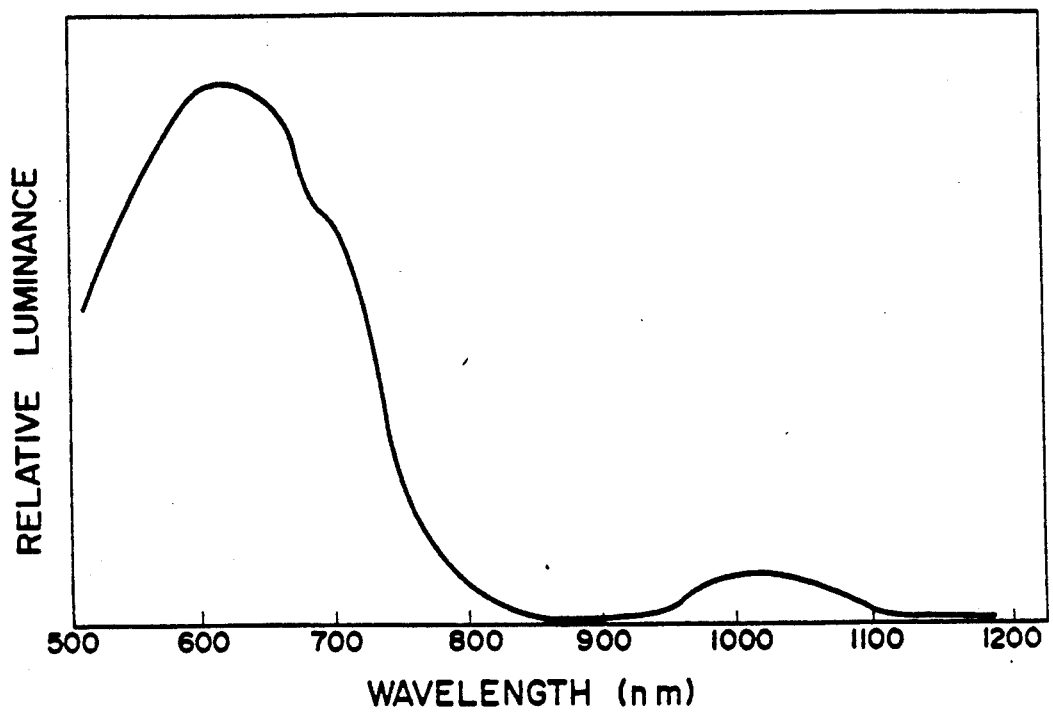
FIG. 1 is a graph showing the spectrum of the stimulating rays of the BaFBr.0.02LiBr: 0.001Eu phosphor of the present invention.

The present invention will be described in detail hereinbelow.

The rare earth element activated complex halide phosphor represented by the above-mentioned formula is prepared by the following process.

The following raw materials are used:

(i) barium fluoride ($BaF_2$)

(ii) at least one barium halide selected from the group consisting of barium chloride ($BaCl_2$), barium bromide ($BaBr_2$) and barium iodide ($BaI_2$), (iii) at least one lithium halide selected from the group consisting of lithium chloride ($LiCl_2$), lithium bromide ($LiBr_2$) and lithium iodide ($LiI_2$), (iv) at least one beryllium halide selected from the group consisting of beryllium chloride ($BeCl_2$), beryllium bromide ($BeBr_2$) and beryllium iodide ($BeI_2$), (v) at least one trivalent halide selected from the group consisting of aluminum chloride ($AlCl_3$), aluminum bromide ($AlBr_3$), aluminum iodide ($AlI_3$), gallium chloride ($GaCl_3$), gallium bromide ($GaBr_2$) and gallium iodide ($GaI_3$), and (vi) at least one rare earth element compound selected from the group consisting of Eu compounds, Tb compounds, Ce compounds, Tm compounds, Dy compounds, Pr compounds, Ho compounds, Nd compounds, Yb compounds, Er compounds, Gd compounds, Lu compounds, Sm compounds and Y compounds, the compounds being in the form of oxides, halides, nitrates, sulfates, and the like.

The above-mentioned raw materials are weighed out in such a ratio that a raw material mixture stoichiometrically represented by the following formula is obtained, and mixed well by means of a ball mill, mixer mill, or the like:

$$BaFX \cdot aLiX' \cdot bBeX_2'' \cdot cM^{III}X_3''' : dA$$

wherein $M^{III}$ is at least one trivalent metal selected from the group consisting of Al and Ga, each of X, X', X'' and X''' is at least one halogen selected from the group consisting of Cl, Br and I, A is at least one rare earth element selected from the group consisting of Eu, Tb, Ce, Tm, Dy, Pr, Ho, Nd, Yb, Er, Gd, Lu, Sm and Y, a, b and c are numbers satisfying the conditions of $0 \leq a \leq 0.1$, $0 \leq b \leq 0.1$, $0 \leq c \leq 0.1$ and $10^{-4} \leq a+b+c+ \leq 0.1$, and d is a number satisfying the condition of $10^{-6} \leq d \leq 0.2$. It is needless to say that when a=0, b=0 or c=0, the corresponding raw material (iii), (iv) or (v) is not used.

Then, the raw material mixture is put into a heat-resistant container such as a quartz boat, an alumina crucible, a quartz crucible, or the like, and fired in an electric furnace. The firing is performed at a temperature ranging from 600° to 1000° C., preferably ranging from 700° to 900° C. Although the firing period is determined depending upon the amount of the raw material mixture placed in the heat-resistant container, the firing temperature employed and so forth, the firing period is generally within the range of 1 to 6 hours. Although the firing may be performed in the air, the firing is preferably performed in an inert atmosphere such as an argon gas atmosphere or a nitrogen gas atmosphere, or in a weak reducing atmosphere such as a nitrogen gas atmosphere containing a small amount of hydrogen gas or a carbon vapor atmosphere. Among the phosphors included in the rare earth element activated complex halide phosphor of the present invention, the phosphor activated with divalent europium ($Eu^{2+}$) emits light of particularly high luminance upon stimulation thereof and, therefore, is very useful practically. In the preparation of the phosphor, a compound of trivalent europium is used as the europium raw material, and the trivalent europium is reduced to divalent europium during the firing. Accordingly, when the phosphor activated with divalent europium is prepared, the firing should be performed in a weak reducing atmosphere. The above-mentioned firing treatment may be repeated by taking out the fired product from the furnace, cooling and pulverizing the fired product, and then refiring the pulverized product under the same firing conditions. After the firing, the firing product is subjected to the processes generally employed in the production of a phosphor, such as pulverizing and sieving, to obtain the phosphor of the present invention.

The above-mentioned raw materials (i), (ii), (iii), (iv) and (v) easily react with each other at a lower temperature than the above-mentioned firing temperature to produce the host material of the phosphor of the present invention. Accordingly, the phosphor of the present invention can also be prepared by the following process. That is, the raw materials (i) to (v) are weighed out in such a ratio that a raw material mixture of the host material stoichiometrically represented by the following formula is obtained, and mixed well by means of a ball mill, a mixer mill, or the like:

wherein $M^{III}$, X, X', X'', X''', a, b and c have the same definitions as mentioned above. Then, the raw material mixture of the host material is maintained at a temperature ranging from 50° to 250° C. for 1 to 6 hour to produce the host material represented by the same formula as mentioned above. Thereafter, the raw material of activator (vi) is added to the host material in a proper amount (an amount equivalent to the above-mentioned value d), and mixed thoroughly therewith. The addition of the raw material of activator (vi) to the host material may be performed by dry method wherein the raw material of activator (vi) itself is directly added to the host material, or may be performed by wet method wherein the raw material of activator (vi) is dissolved in a proper solvent to obtain a solution, and then the solution is added to the host material. After the mixing, the mixture obtained is put into a heat-resistant container and fired in an electric furnace under the same conditions as mentioned above. The fired product is subjected to the same processes as mentioned above to obtain the phosphor of the present invention.

The rare earth element activated complex halide phosphor of the present invention prepared in accordance with either of the above-mentioned processes is represented by the formula

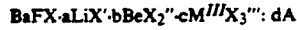

wherein $M^{III}$ is at least one trivalent metal selected from the group consisting of Al and Ga, each of X, X', X'' and X''' is at least one halogen selected from the group consisting of Cl, Br and I, A is at least one rare earth element selected from the group consisting of Eu, Tb, Ce, Tm, Dy, Pr, Ho, Nd, Yb, Er, Gd, Lu, Sm and Y, a, b and c are numbers satisfying the conditions of $0 \leq a \leq 0.1$, $0 \leq b \leq 0.1$, $0 \leq c \leq 0.1$ and $10^{-4} \leq a+b+c \leq 0.1$, and d is a number satisfying the condition of $10^{-6} \leq d \leq 0.2$. From the viewpoint of the luminance of light emitted by the phosphor upon stimulation thereof, a, b and c are preferably numbers satisfying the condition of $3 \times 10^{-4} \leq a+b+c \leq 3 \times 10^{-2}$, and d is preferably a number satisfying the condition of $2 \times 10^{-5} \leq d \leq 5 \times 10^{-2}$. Among the activators (A), Eu, Ho, Er or Gd provides a phosphor which emits light of particularly high luminance upon stimulation thereof.

The phosphor of the present invention represented by the above-mentioned formula emits light of high luminance when stimulated by an electromagnetic wave having a wavelength within the range of 500 to 800nm after exposure to a radiation such as X-rays, ultraviolet rays, cathode rays, or the like. The luminance of light emitted by the phosphor of the present invention upon stimulation thereof is much higher than the luminance of light emitted by the stimulable phosphors described in the above-mentioned U.S. Pat. No. 3,859,527 upon stimulation thereof. Further, the luminance of light emitted by the phosphor of the present invention upon stimulation thereof is higher than the luminance of light emitted by the rare earth element activated barium fluorohalide phosphor described in the above-mentioned U.S. Pat. No. 4,239,968 upon stimulation thereof. Accordingly, by employing the phosphor of the present invention in a radiation image storage panel, there can be obtained a radiation image storage panel which has higher sensitivity than the radiation image storage panel employing the above-mentioned rare earth element activated barium fluorohalide phosphor and, or course, than the radiation image storage panels employing the stimulable phosphors described in the above-mentioned U.S. Pat. No. 3,859,527.

Moreover, the phosphor of the present invention exhibits much less fading than the stimulable phosphors described in the above-mentioned U.S. Pat. No. 3,859,527. Further, the phosphor of the present invention exhibits less fading than the above-mentioned rare earth element activated barium fluorohalide phosphor. Accordingly, by employing the phosphor of the present invention in a radiation image storage panel, a radiation image storage panel having high storage ability can be obtained. Further, by employing the phosphor of the present invention in a radiation image storage panel, there can be obtained a radiation image storage panel which exhibits little difference between the initial output and the final output when the radiation image stored in the panel is reproduced by scanning the overall face of the panel with stimulating rays. By using such a radiation image storage panel, recording and reproduction of radiation images can be performed with high reliability.

FIG. 1 is a graph showing the spectrum of the stimulating rays of the BaFBr·0.02LiBr:0.001Eu phosphor included in the rare earth element activated complex halide phosphors of the present invention. The spectrum was measured using a phosphor exposed to X-rays of 80 KVp. As is clear from FIG. 1, the BaFBr·0.02LiBr:0.001Eu phosphor can be stimulated with rays having a wavelength within the range of 500 to 1100 nm, and optimum stimulation thereof can be performed within the range of 500 to 800 nm. Although the wavelength range of the stimulating rays of the rare earth element activated complex halide phosphor of the present invention varies slightly depending upon the variation in the composition thereof, it can be generally said to be from 500 to 1100 nm, and the optimum wavelength range thereof to be from 500 to 800 nm. The wavelength range and the optimum wavelength range of the stimulating rays of the phosphor of the present invention are almost the same as those of the above-mentioned rare earth element activated barium fluorohalide phosphor.

It is desirable that a stimulable phosphor employed in a radiation image storage panel emits light of as short a wavelength as possible upon stimulation thereof. The reasons for this are as follows.

(i) In detecting the light emitted by the radiation image storage panel upon stimulation thereof, it is necessary to separate the light from the stimulating rays reflected by the panel.

(ii) The photosensor for detecting the light emitted by the panel upon stimulation thereof generally has high sensitivity to rays having a wavelength of shorter than 600 nm.

Figure 2:
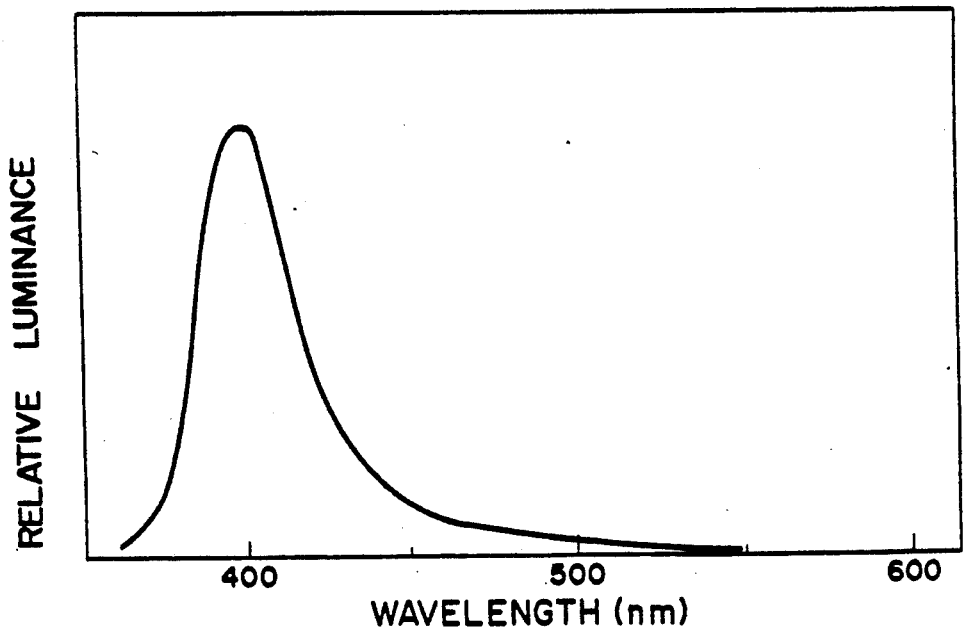
FIG. 2 is a graph showing the emission spectrum of the BaFBr.0.02LiBr: 0.001Eu phosphor of the present invention upon stimulation thereof.

The rare earth element activated complex halide phosphor of the present invention satisfies the above condition. That is, the rare earth element activated complex halide phosphor of the present invention exhibits an emission having its main peak in the wavelength region shorter than 500 nm upon stimulation thereof. Accordingly, the light emitted by the phosphor upon stimulation thereof can easily be separated from the stimulating rays. Further, the spectrum of the light is in good agreement with the spectral sensitivity of the photosensor and, therefore, can be detected efficiently by the photosensor. The emission spectrum of the BaFBr·0.02LiBr:0.001Eu phosphor measured by stimulating the phosphor with a He-Ne laser beam (633 nm) after exposure to X-rays of 80 KVp is illustrated in FIG. 2.

The radiation image storage panel of the present invention has a fluorescent layer comprising a proper binder and at least one phosphor selected from the group of the above-mentioned rare earth element activated complex halide phosphors of the present invention dispersed therein. The fluorescent layer is formed by dispersing the phosphor in a proper binder to prepare a coating dispersion, and then applying the coating dispersion by a conventional coating method to form a uniform layer. Although the fluorescent layer itself can be a radiation image storage panel when the fluorescent layer is self-supporting, the fluorescent layer is generally provided on a proper substrate to form a radiation image storage panel. Further, a protective layer for physically and chemically protecting the fluorescent layer is usually provided on the exposed surface of the fluorescent layer. Furthermore, a primer layer is sometimes provided between the fluorescent layer and the substrate to closely bond the fluorescent layer to the substrate. The radiation image storage panel of the present invention has, for example, the following constitution.

1. Radiation image storage panel consisting solely of a fluorescent layer which is self-supporting.

2. Radiation image storage panel comprising a first protective layer, a self-supporting fluorescent layer disposed thereon and a second protective layer disposed further thereon.

3. Radiation image storage panel comprising a substrate and a fluorescent layer disposed thereon.

4. Radiation image storage panel comprising a substrate, a primer layer disposed thereon and a fluorescent layer disposed further thereon.

5. Radiation image storage panel comprising a substrate, a fluorescent layer disposed thereon and a protective layer disposed further thereon.

6. Radiation image storage panel comprising a substrate, a primer layer disposed thereon, a fluorescent layer disposed further thereon and a protective layer disposed further thereon.

In the radiation image storage panel of the present invention, a smaller mean particle size of the rare earth element activated complex halide phosphor tends to improve the granularity of the panel but to degrade its sensitivity. Conversely, a larger mean particle size of the rare earth element activated complex halide phosphor tends to increase the sensitivity of the panel but to coarsen its granularity. In consideration of these tendencies, the rare earth element activated complex halide phosphor employed in the radiation image storage panel of the present invention is generally selected from those having a mean particle size ranging from 0.1 to 100$\mu$, preferably from 1 to 30$\mu$. Further, the amount of the rare earth element activated complex halide phosphor employed is properly decided in view of the recording and reproducing performance and the economy of the radiation image storage panel. The amount thereof is generally within the range of 3 to 300 mg per 1cm$^2$ of the panel.

As the binder employed in the fluorescent layer of the radiation image storage panel of the present invention, there can, for example, be used such binders commonly used in forming layers such as gum arabic, protein such as gelatin, polysaccharide such as dextran, polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and the like. Generally, the binder is used in an amount of 0.01 to 1 part by weight per one part by weight of the rare earth element activated complex halide phosphor. However, from the viewpoint of the sensitivity and the sharpness of the panel obtained, the amount of the binder should preferably be small. Accordingly, in consideration of both the sensitivity and the sharpness of the panel and the easiness of application of the coating dispersion, the binder is preferably used in an amount of 0.03 to 0.2 parts by weight per one part by weight of the rare earth element activated complex halide phosphor. The thickness of the fluorescent layer is generally within the range of 10$\mu$ to 1 mm.

In the radiation image storage panel of the present invention, the fluorescent layer is generally supported on a substrate. As the substrate, various materials such as polymer material, glass, wool, cotton, paper, metal, or the like can be used. From the viewpoint of handling the panel as an information recording medium, the substrate should preferably be processed into a sheet or a roll having flexibility. In this connection, as the substrate is preferable a plastic film such as a cellulose acetate film, polyester film, polyethylene terephthalate film, polyamide film, polyimide film, triacetate film, polycarbonate film, or the like; ordinary paper; or processed paper such as photographic paper, printing paper such as coated paper and art paper, baryta paper, resin-coated paper, sized paper described in Belgian Pat. No. 784,615 which is sized with polysaccharide, pigment-containing paper which contains a pigment such as titanium dioxide, sized paper which is sized with polyvinyl alcohol, or the like. The substrate may have a primer layer on one surface thereof (the surface on which the fluorescent layer is provided) for the purpose of holding the fluorescent layer tightly. As the material of the primer layer, an ordinary adhesive can be used. In providing a fluorescent layer on the substrate or on the primer layer, a coating dispersion comprising the rare earth element activated complex halide phosphor dispersed in a binder may be directly applied to the substrate or to the primer layer to form a fluorescent layer. Alternatively, a fluorescent layer formed beforehand may be bonded to the substrate or to the primer layer. Where the substrate used is permeable to the stimulating rays of the rare earth element activated complex halide phosphor, the radiation image storage panel can be exposed to the stimulating rays from the substrate side.

Further, in the radiation image storage panel of the present invention, a protective layer for physically and chemically protecting the fluorescent layer is generally provided on the surface of the fluorescent layer intended for exposure (on the side opposite the substrate). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such as nitrocellulose, ethylcellulose, cellulose acetate, polyester, polyethylene terephthalate, and the like can be used.

The radiation image storage panel of the present invention may be colored with a colorant as disclosed in U.S. patent application Ser. No. 156,520. Further, the fluorescent layer of the radiation image storage panel of the present invention may contain a white powder dispersed therein as disclosed in U.S. patent application Ser. No. 144,656. By using a colorant or a white powder, a radiation image storage panel which provides an image of high sharpness can be obtained.

Figure 3:
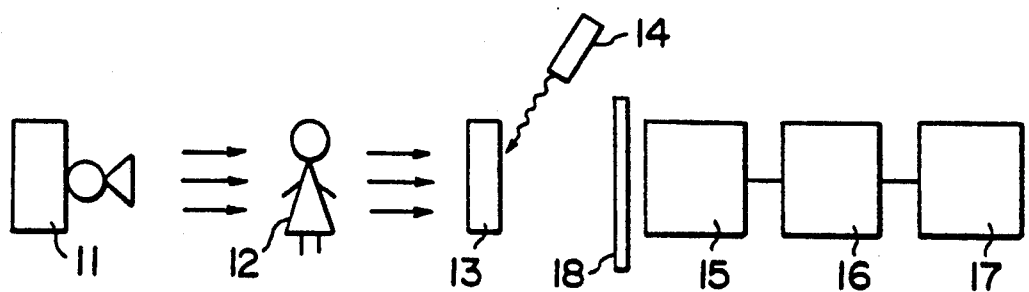
FIG. 3 schematically shows the method for recording and reproducing a radiation image using the radiation image storage panel of the present invention.

FIG. 3 schematically shows the method for recording and reproducing a radiation image using the radiation image storage panel of the present invention. In the method, a radiation source 11, an object 12, a radiation image storage panel 13 of the present invention, a light source 14 emitting stimulating rays which stimulate the fluorescent layer of the panel 13 to release the radiation energy stored therein as fluorescent light, a photosensor 15 for detecting the fluorescent light emitted by the panel 13, a reproduction device 16 for converting the electrical signal produced by the photosensor 15 into an image signal corresponding to the radiation image, a display device 17 for displaying the image, and a filter 18 for cutting the stimulating rays emitted by the light source 14 and reflected by the panel 13 and for transmitting only the fluorescent light emitted by the panel 13 are arranged as shown in FIG. 3. In the method shown in FIG. 3, the photosensor 15 is used as a detector for detecting the light emitted by the panel 13, and reproduction of a radiation image is performed by means of the photosensor 15, the reproduction device 16 and the display device 17. However, the means for reproducing a radiation image is not limited thereto.

As shown in FIG. 3, the object 12 is positioned between the radiation source 11 and the radiation image storage panel 13. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the fluorescent layer of the panel 13, and electrons or holes are generated in the fluorescent layer. The amount of the electrons or holes generated is in proportion to the amount of the radiation absorbed. The electrons or holes are stored in the trap of the rare earth element activated complex halide phosphor, and thus, the radiation image is stored in the panel 13. Then, the radiation stored in the panel 13 is visualized by stimulation with the stimulating rays emitted by the light source 14. That is, the fluorescent layer of the panel 13 is scanned with the stimulating rays emitted by the light source 14, whereby the electrons or holes stored in the trap level of the rare earth element activated complex halide phosphor are expelled therefrom, and the radiation image stored in the panel 13 is released as fluorescent light. Since, as mentioned above, the rare earth element activated complex halide phosphor employed in the fluorescent layer of the panel 13 can be stimulated with rays having a wavelength within the range of 500 to 1100 nm, and the optimum stimulation thereof can be performed within the range of 500 to 800 nm, an electromagnetic wave having a wavelength within the range of 500 to 1100 nm, preferably within the range of 500 to 800 nm is used as the stimulating rays.

The luminance of the fluorescent light emitted by the panel 13 is in proportion to the number of the electrons or holes stored in the fluorescent layer of the panel 13, that is, the amount of the radiation absorbed thereby. The fluorescent light (light signal) is detected and converted into an electrical signal sequentially by the photosensor 15 which is, for example, a photomultiplier. The electrical signal obtained is converted into an image signal corresponding to the radiation image by the reproduction device 16, and a visible image is displayed by the display device 17. Thus, the radiation image is reproduced.

The radiation image storage panel of the present invention has higher sensitivity and exhibits less fading than the radiation image storage panels employing the stimulable phosphors described in the above-mentioned U.S. Pat. No. 3,859,527 or the radiation image storage panel employing the rare earth element activated barium fluorohalide phosphor described in the above-mentioned U.S. patent application Ser. No. 57,091. Accordingly, the method for recording and reproducing a radiation image using the radiation image storage panel of the present invention has higher sensitivity and provides an image of higher reliability than that using the above-mentioned conventional radiation image storage panels.

As described hereinabove, in accordance with the present invention, it is possible to provide a stimulable phosphor which emits light of high luminance upon stimulation thereof and exhibits little fading. It is also possible to provide a radiation image storage panel having markedly high utility. The stimulable phosphor of the present invention also emits spontaneous light of high luminance when excited by X-rays, cathode rays, ultraviolet rays, or the like. Accordingly, it is needless to say that the use of the stimulable phosphor of the present invention is not limited to only the radiation image storage panel.

The present invention will hereinbelow be described referring to an example.

EXAMPLE 87.68 grams of guaranteed reagent $BaF_2$ (manufactured by Morita Kagaku Co., Ltd.), 1.74 grams of guaranteed reagent LiBr (manufactured by Wako Junyaku Co., Ltd.) and 166.60 grams of guaranteed $BaBr_2 \cdot 2H_2O$ (manufactured by Kanto Kagaku Co., Ltd.) were weighed out, and mixed thoroughly for 30 minutes by means of an agate mortar to obtain a mixture. Then, the mixture was maintained at a temperature of 150° C. for 2 hours to produce BaFBr·0.02LiBr. Thereafter, guaranteed reagent $Eu_2O_3$ (manufactured by Wako Junyaku Co., Ltd.) dissolved in HBr was added to the BaFBr·0.02LiBr in the stoichiometric ratio of $10^{-3}$ gram atoms of Eu per 1 mole of the BaFBr·0.02LiBr, and mixed thoroughly therewith to obtain a slurry. The slurry obtained was heated and dried at a temperature of 130° C. for 2 hours in a depressurized atmosphere, and then pulverized and mixed for 2 hours by means of an automatic mortar made of alumina of high purity (GRINDOMAT, manufactured by RETSCH-MÜHLE Co., Ltd.) to obtain a mixture of BaFBr·0.02LiBr and $EuBr_3$.

20 grams of the mixture thus prepared was put into a quartz boat and fired in an electric furnace. The firing was performed in a nitrogen gas stream of a flow rate of 280 ml/min containing 1 volume % of a hydrogen gas at a temperature of 900° C. for 4 hours. After the firing, the quartz boat was taken out from the furnace, allowed to stand and cooled to room temperature. The fired product obtained was pulverized and sieved to obtain BaFBr·0.02LiBr : 0.001Eu phosphor of the present invention.

The following four kinds of phosphors of the present invention were prepared in the same manner as described above except for using the raw materials necessary for the preparation of the phosphors in a proper amount instead of the above-mentioned raw materials.

BaFBr·0.01$BeBr_2$: 0.003Eu phosphor
BaFBr·0.01LiBr·0.01$AlBr_3$: 0.0005Eu phosphor
BaFBr·0.01$GaBr_3$: 0.003Eu phosphor
BaFBr·0.01$AlBr_3$: 0.001Eu, 0.001Dy phosphor Then, ten kinds of radiation image storage panels were manufactured using the above-mentioned five kinds of phosphors of the present invention, SrS:Eu, Sm phosphor described in the above-mentioned U.S. Pat. No. 3,859,527 and the following four kinds of phosphors included in the rare earth element activated barium fluorohalide phosphors described in the above-mentioned U.S. patent application Ser. No. 57,091.

BaFCl phosphor
BaFCl: 0.001Eu phosphor
BaFCl: 0.0001Ce phosphor
BaFBr: 0.0008Eu phosphor All of the radiation image storage panels were manufactured in accordance with the following manufacturing process. That is, a coating dispersion having a viscosity of 50 centistokes was prepared by mixing 8 parts by weight of the phosphor and 1 part by weight of a nitrocellulose using a solvent (a mixture of acetone, ethyl acetate and butyl acetate). Then, the coating dispersion was uniformly applied to a horizontally placed polyethylene terephthalate film (substrate) and dried naturally for one day to form a fluorescent layer about 300μ thick thereon.

Thereafter, the sensitivity of the ten kinds of radiation image storage panels obtained was examined. The result is shown in Table 1 below. In Table 1, the sensitivity is represented by the relative luminance of the light emitted by the panel with reference to that of the light emitted by the panel employing the SrS:Eu, Sm phosphor which is defined to be 1. The luminance was measured by exposing the fluorescent layer of the panel to X-rays of 80 KVp, stimulating the fluorescent layer with a He-Ne laser beam (633 nm), and detecting the fluorescent light emitted by the fluorescent layer by a photosensor (a photomultiplier having a spectral sensitivity of S-5).

TABLE 1

| Panel No. | Phosphor | Relative Luminance |
|---|---|---|
| 1 | SrS: 0.0001 Eu, 0.0001 Sm | 1 |
| 2 | BaFCl | 300 |
| 3 | BaFCl: 0.001 Eu | 1000 |
| 4 | BaFCl: 0.001 Ce | 500 |
| 5 | BaFBr: 0.0008 Eu | 2000 |
| 6 | BaFBr·0.02 LiBr: 0.001 Eu | 3400 |
| 7 | BaFBr·0.01 $BeBr_2$: 0.003 Eu | 3200 |
| 8 | BaFBr·0.01 LiBr·0.01 $AlBr_3$: 0.0005 Eu | 4000 |
| 9 | BaFBr·0.01 $GaBr_3$: 0.003 Eu | 3100 |
| 10 | BaFBr·0.01 $AlBr_3$: 0.001 Eu, 0.001 Dy | 3800 |

As is clear from Table 1, the radiation image storage panels of the present invention (No. 6–No. 10) have much higher sensitivity than the radiation image storage panel employing the SrS:Eu, Sm phosphor (No. 1). Further, the radiation image storage panels of the present invention have higher sensitivity than the radiation image storage panels employing the rare earth element activated barium fluorohalide phosphors (No. 2–No. 5). Accordingly, the rare earth element activated complex halide phosphors of the present invention emit light of much higher luminance than the SrS:Eu,Sm phosphor. Further, the rare earth element activated complex halide phosphors of the present invention emit light of higher luminance than the rare earth element activated barium fluorohalide phosphors.

Figure 4:
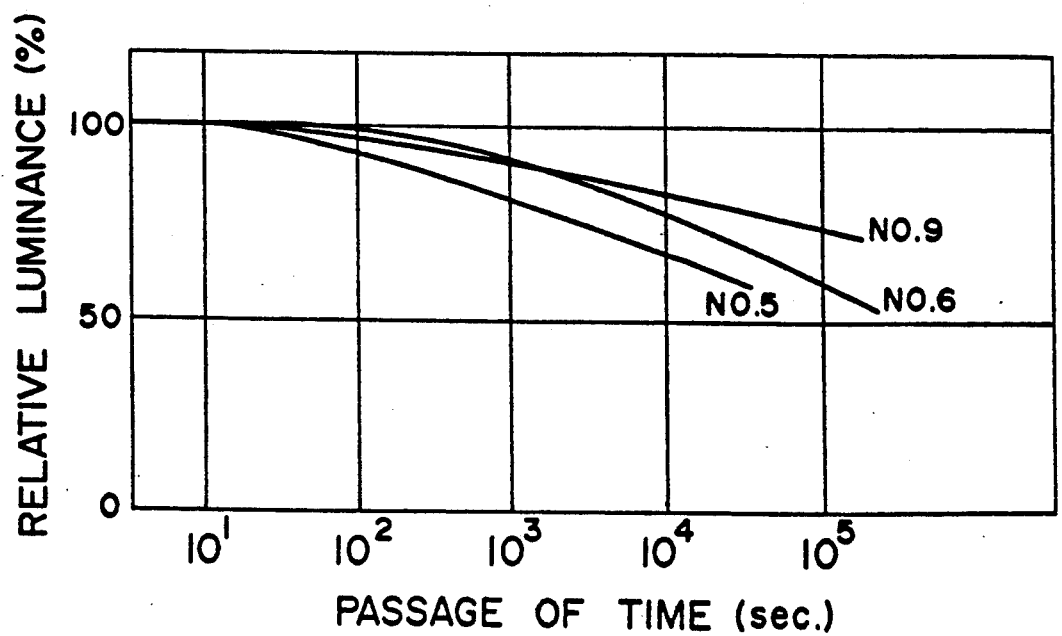
FIG. 4 is a graph showing the fading property of the radiation image storage panels of the present invention (Nos. 6 and 9) in comparison with that of the conventional radiation image storage panel (No. 5).

Further, the fading property of the radiation image storage panels Nos. 5, 6 and 9 was examined. The result is shown in FIG. 4. In FIG. 4, the fading property is represented by the decrease of the luminance of light emitted by the panel upon stimulation thereof with the passage of time. The fading property was measured by exposing the fluorescent layer of the panel to X-rays of 80 KVp, leaving the panel to stand for various periods of time, stimulating the fluorescent layer of the panel with a He—Ne laser beam (633 nm), and detecting the light emitted by the fluorescent layer. The luminance (ordinate axis) is represented by a relative value with reference to that measured by stimulating the fluorescent layer of the panel immediately after the exposure which is defined to be 100.

As is clear from FIG. 4, the radiation image storage panels of the present invention (Nos. 6 and 9) exhibit better fading property than the radiation image storage panel employing the rare earth element activated barium fluorohalide phosphor (No. 5). Accordingly, the rare earth element activated complex halide phosphors of the present invention exhibit better fading property than the rare earth element activated barium fluorohalide phosphor.

We claim:
1. A rare earth element activated complex halide phosphor represented by the formula:

$$BaFX \cdot cGaX_3''' : dA$$

each of X and X''' is at least one halogen selected from the group consisting of Cl, Br and I, A is at least one rare earth element selected from the group consisting of Eu, Tb, Ce, Tm, Dy, Pr, Ho, Nd, Yb, Er, Gd, Lu, Sm and Y, c is a number satisfying the condition of $10^{-4} \leq c \leq 0.1$, and d is a number satisfying the condition of $10^{-6} \leq d \leq 0.2$.

2. A rare earth element activated complex halide phosphor as defined in claim 1 wherein said c is a number satisfying the condition of $3 \times 10^{-4} \leq c \leq 3 \times 10^{-2}$, and said d is a number satisfying the condition of $2 \times 10^{-5} \leq d \leq 5 \times 10^{-2}$.

* * * * *